United States Patent
Noh

(10) Patent No.: US 10,352,265 B2
(45) Date of Patent: Jul. 16, 2019

(54) METHOD OF DETECTING DEFEAT DEVICES

(71) Applicants: HYUNDAI MOTOR COMPANY, Seoul (KR); KIA MOTORS CORPORATION, Seoul (KR)

(72) Inventor: Tae-Gon Noh, Busan (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 65 days.

(21) Appl. No.: 15/832,453

(22) Filed: Dec. 5, 2017

(65) Prior Publication Data

US 2018/0171922 A1   Jun. 21, 2018

(30) Foreign Application Priority Data

Dec. 15, 2016  (KR) .................... 10-2016-0171738

(51) Int. Cl.
| | |
|---|---|
| *F02D 41/00* | (2006.01) |
| *F02D 41/22* | (2006.01) |
| *F02M 35/10* | (2006.01) |
| *F02M 35/104* | (2006.01) |

(52) U.S. Cl.
CPC ......... *F02D 41/22* (2013.01); *F02D 41/0007* (2013.01); *F02D 41/222* (2013.01); *F02M 35/1038* (2013.01); *F02M 35/10386* (2013.01); *F02D 2041/228* (2013.01); *F02D 2200/0406* (2013.01); *F02D 2200/0408* (2013.01); *F02D 2400/11* (2013.01); *F02M 35/104* (2013.01);
(Continued)

(58) Field of Classification Search
CPC .... F02D 41/22; F02D 41/222; F02D 41/0007; F02D 2200/0408; F02D 2200/0406; F02D 2400/11; F02D 2041/228; F02M 35/1038; F02M 35/10386; F02M 35/10157; F02M 35/104; Y02T 10/40; Y02T 10/144
See application file for complete search history.

(56) References Cited

U.S. PATENT DOCUMENTS

| | | | | |
|---|---|---|---|---|
| 5,815,071 | A * | 9/1998 | Doyle ................ | B60K 31/0058 340/12.25 |
| 7,984,612 | B2 * | 7/2011 | Weymann ............... | F02B 37/00 415/17 |

(Continued)

FOREIGN PATENT DOCUMENTS

KR   10-1500405 B1   3/2015

*Primary Examiner* — Russell Frejd
(74) *Attorney, Agent, or Firm* — Morgan Lewis & Bockius LLP

(57) ABSTRACT

A method of detecting a defeat device includes: determining turbo operation when a turbocharger of a vehicle is operated; determining flow rate of the air to be applied to an intake manifold wherein it is determined whether which flow rate out of a first flow rate of the air passing through a throttle valve and a second flow rate of the air measured by a hot-film air mass flow (HFM) sensor is used as the flow rate of the intake manifold; determining whether pressure in the intake manifold is in a normal range based on the flow rate of the intake manifold; and determining that the defeat device is installed if it is determined that the pressure in the intake manifold is not in the normal range and storing information of the defeat device.

10 Claims, 4 Drawing Sheets

(52) U.S. Cl.
CPC ...... *F02M 35/10157* (2013.01); *Y02T 10/144* (2013.01); *Y02T 10/40* (2013.01)

(56) References Cited

U.S. PATENT DOCUMENTS

| | | | | |
|---|---|---|---|---|
| 8,666,588 | B2* | 3/2014 | Geilen | G07C 5/0808 701/29.1 |
| 9,068,492 | B2* | 6/2015 | Bogema | F01N 3/2066 |
| 2002/0099496 | A1* | 7/2002 | Weisman | B60K 31/04 701/115 |
| 2003/0023367 | A1* | 1/2003 | Avery, Jr. | F01N 3/023 701/110 |
| 2006/0143472 | A1* | 6/2006 | Feilen | G06F 21/79 713/189 |
| 2009/0195368 | A1* | 8/2009 | Kurnik | G06F 21/554 340/426.1 |
| 2010/0089055 | A1* | 4/2010 | Severin | F01D 17/165 60/602 |
| 2014/0309905 | A1* | 10/2014 | Drew | F02D 29/02 701/101 |
| 2017/0103591 | A1* | 4/2017 | Ramberg | G07C 5/0808 |

* cited by examiner

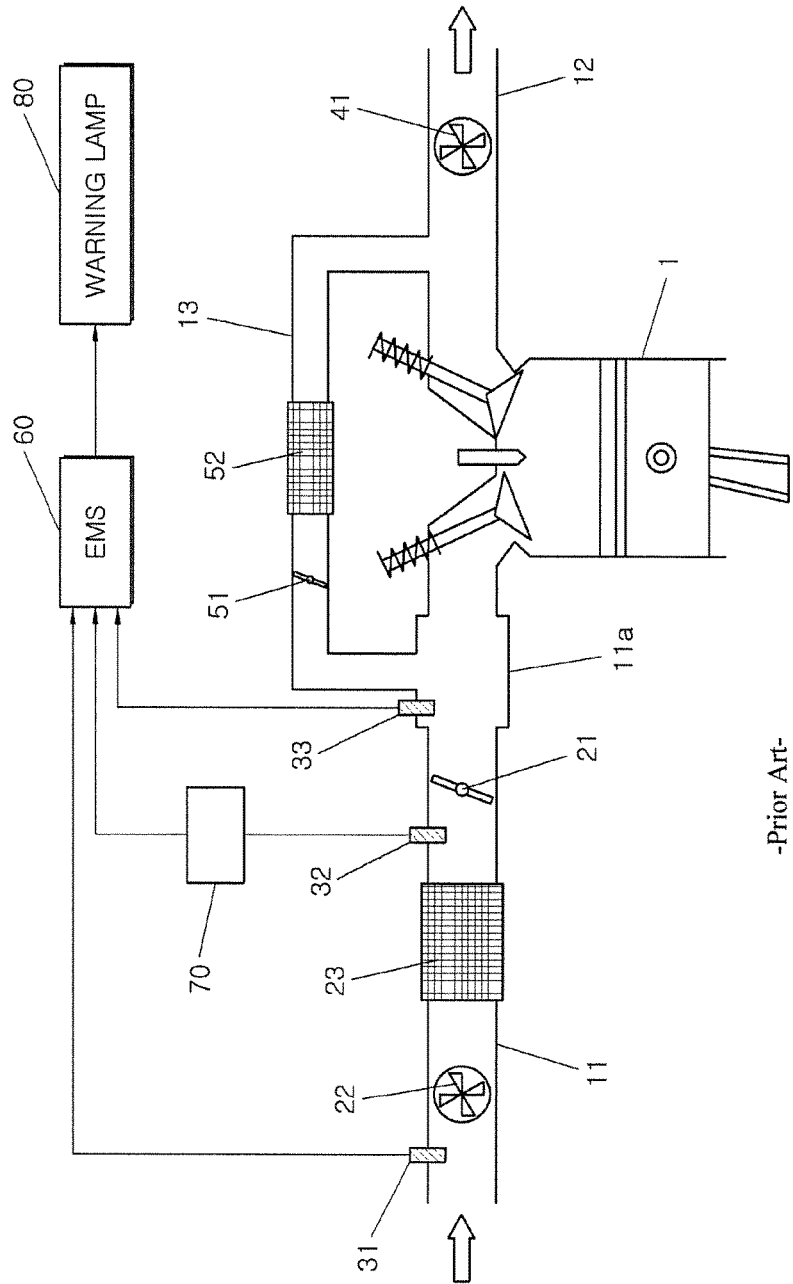

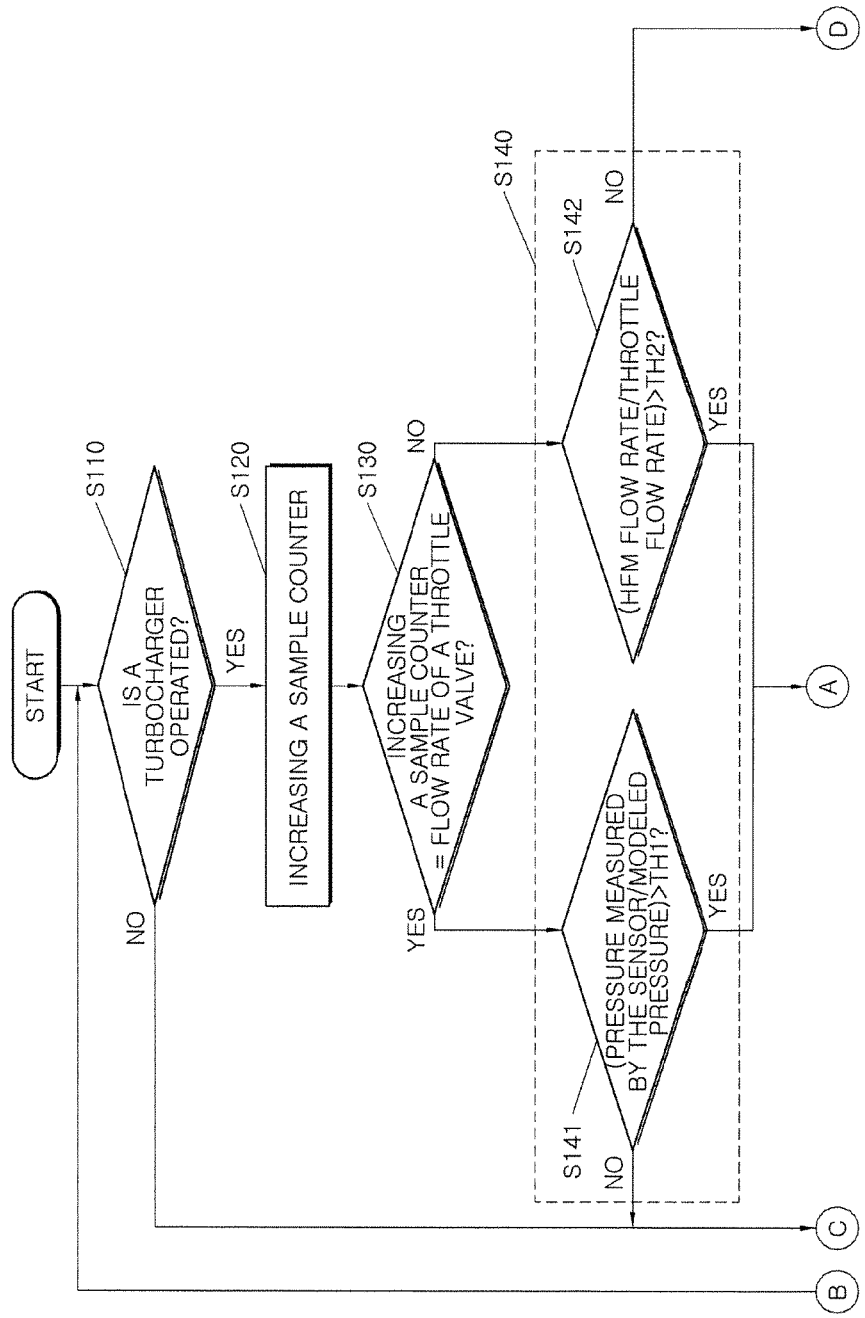

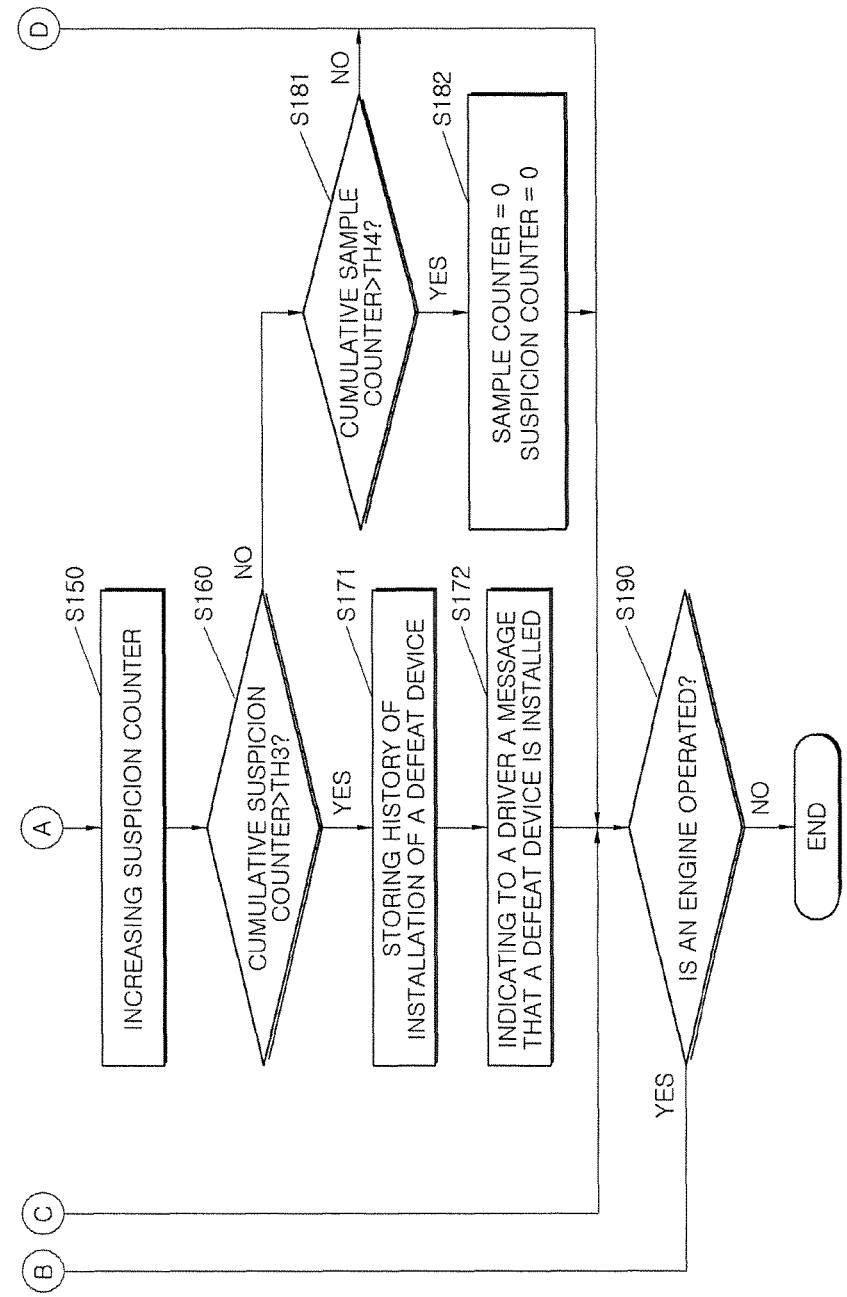

METHOD OF DETECTING DEFEAT DEVICES

CROSS-REFERENCE TO RELATED APPLICATIONS

This application claims the benefit of priority to Korean Patent Application No. 10-2016-0171738, filed on Dec. 15, 2016, the disclosure of which is incorporated herein by reference in its entirety.

TECHNICAL FIELD

The present disclosure relates to a method of detecting defeat devices which are intended to arbitrarily raise output of an engine in a vehicle by falsifying input data for controlling the engine wherein the method detects the defeat devices and stores whether or not the defeat devices are installed and then allows a driver to recognize that fact.

BACKGROUND

An engine installed in a vehicle is controlled by various data input for driving the engine.

As shown in FIG. 1, an intake pipe 11 through which outside air flows into an engine 1 is provided with a compressor 22 of a turbocharger for compressing intake air, an intercooler 23 for cooling the compressed air and a throttle valve 21 for controlling amount of the air flowing into the engine; an exhaust pipe 12 through which exhaust gas burned in the engine 1 is discharged is provided with a turbine 41 of the turbocharger rotated by the exhaust gas, various post-processing devices and the like; and an exhaust gas recirculation (EGR) line 13 for recirculation of the exhaust gas has an EGR valve 51, an EGR cooler 51 and the like.

In addition, the engine 1 is controlled by acquiring information on the intake air flowing into the engine 1 through a hot-film air mass flow sensor (HFM) 31 provided at an inlet of the intake pipe 11 to measure temperature and amount of the intake air, a boost pressure sensor 32 installed between the compressor 22 and the throttle valve 21 to measure pressure boosted by turbo operation, and a manifold absolute pressure (MAP) sensor 33 for measuring pressure in the intake manifold 11a and taking into consideration of an operation amount of an accelerator pedal operated by a driver and the like.

Such an engine is manufactured so as to generate output within a predetermined range.

However, some drivers often install an arbitrary tampering device or a defeat device which is intended to tamper a part of input data for driving the engine and generate output greater than that within the range set at the time of manufacturing the engine.

For example, as shown in FIG. 2, a defeat device 70 is installed between the boost pressure sensor 32 and an engine management system (EMS) 60 to raise output of the engine 1 by tampering or falsifying signals output from the boost pressure sensor 32. The defeat device 70 raises output of the engine 1 by lowering an output value of the boost pressure sensor 32 and inputting it to the EMS 60. Here, the EMS 60 may be an electronic control unit (ECU) or integrated with the ECU.

When receiving boost pressure lower than actual pressure, the EMS 60 calculates flow rate passing through the throttle to be smaller than actual flow rate. When calculating the modeled pressure of the intake manifold, flow rate flowing into the intake manifold and flow rate discharging from the intake manifold (flow rate flowing into cylinders) are calculated to be the same. If the defeat device 70 is installed, input flow rate becomes greater than output flow rate, i.e., "input flow rate>output flow rate" so that the modeled pressure is raised and hence output of the engine 1 is enhanced.

However, if the output of the engine 1 is tampered arbitrarily so as to be raised, parts of the engine are damaged or a turbo actuator is damaged due to knocking, pre-ignition and the like. The engine 1 is generally manufactured to have mechanical strength and durability in consideration of a predetermined output. However, if the output of the engine is raised arbitrarily, the engine 1 is damaged, which may cause a serious accident.

Nonetheless, if a driver installs the defeat device 70 to raise output of the engine 1 during using the vehicle and removes the defeat device 70 only at the time when the vehicle is repaired or inspected, there is a problem that when the engine 1 is failed, cause of the failure cannot be find out precisely and hence it cannot cope with the failure properly.

SUMMARY

The present disclosure has been made in an effort to solve the above-described problems associated with the prior art. An object of the present disclosure is to provide a method of detecting a defeat device which is intended to arbitrarily raise output of an engine in a vehicle by tampering input data for controlling the engine wherein the method can detect whether the defeat device has ever been installed or not.

Another object of the present disclosure is to provide a method of detecting a defeat device wherein the method stores history of installation of the defeat device when the defeat device is detected and enables a repairman or an inspector to recognize such fact when a vehicle is repaired or inspected.

Still another object of the present disclosure is to provide a method of detecting a defeat device wherein the method enables a repairman or an inspector to recognize that the defeat device is installed and induce removal of the defeat device.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure for accomplishing the objects as mentioned above, a method of detecting a defeat device comprises: determining, by an engine management system (EMS), turbo operation wherein it is determined whether a turbocharger of a vehicle is operated; determining, by the EMS, flow rate of air to be applied to an intake manifold wherein it is determined whether which flow rate out of a first flow rate of air passing through a throttle valve and a second flow rate of air measured by a hot-film air mass flow (HFM) sensor is used as the flow rate of the intake manifold; determining, by the EMS, whether pressure in the intake manifold is in a normal range based on the flow rate of the intake manifold; and determining, by the EMS, that the defeat device is installed when it is determined that the pressure in the intake manifold is not in the normal range and storing information of the defeat device.

The method further comprises, after the step of determining whether pressure in the intake manifold is in the normal range is performed, increasing a suspicion counter representing that the defeat device is estimated to be installed if it is determined in the step of determining whether pressure in the intake manifold is in the normal range that the pressure in the intake manifold is not in the normal range, and confirming that the defeat device is installed by determining whether a value obtained by cumulating the suspicion counters is greater than a threshold value TH3 on which confirmation of installation of the defeat device is based, wherein if the value obtained by cumulating the suspicion counters is greater than the threshold value TH3 on which confirmation of installation of the defeat device is based, the step of storing history that the defeat device is installed is performed.

If the flow rate passing through the throttle valve is applied as the flow rate of the intake manifold in the step of determining flow rate of the air to be applied to the intake manifold, it is determined in the step of determining whether pressure in the intake manifold is in a normal range whether a value obtained by dividing pressure measured by a manifold absolute pressure (MAP) sensor by the pressure in the intake manifold (pressure measured by the sensor/modeled pressure) exceeds a predetermined first threshold value TH1.

If the flow rate of the air measured by the HFM sensor is applied as the flow rate of the intake manifold in the step of determining flow rate of the air to be applied to the intake manifold, it is determined in the step of determining whether pressure in the intake manifold is in a normal range whether a value obtained by dividing the flow rate measured by the HFM sensor by the flow rate of the throttle valve (HFM flow rate/throttle flow rate) exceeds a predetermined second threshold value TH2.

The method further comprises warning installation of the defeat device for notifying a driver that the defeat device is installed after the step of storing history that the defeat device is installed is performed.

The method further comprises increasing a sample counter at every time when the turbocharger is operated between the step of determining turbo operation and the step of determining flow rate of the air to be applied to an intake manifold wherein if the value obtained by cumulating the suspicion counters exceeds a predetermined value within the number of times that the sample counters are cumulated, it is confirmed that the defeat device is installed.

The method further comprises comparing whether or not the value obtained by cumulating the sample counters is greater than a predetermined threshold value TH4 for resetting the sample counter and the suspicion counter when it is determined in the step of confirming that the defeat device is installed that the value obtained by cumulating the suspicion counters is not greater than the threshold value TH3 on which confirmation of installation of the defeat device is based, and resetting the sample counter and the suspicion counter to zero when the value obtained by cumulating the sample counters exceeds the predetermined threshold value TH4 for resetting the sample counter and the suspicion counter.

The method further comprises determining whether an engine is operated if it is determined in the step of determining turbo operation that the turbocharger is not operated or if it is determined in the step of determining whether pressure in the intake manifold is in a normal range that pressure in the intake manifold is in the normal range, wherein if the engine is operated, the procedure is returned to the step of determining turbo operation.

The method further comprises determining whether the engine is operated after the step of warning that the defeat device is installed is performed, wherein if the engine is operated, the procedure is returned to the step of determining turbo operation.

The method further comprises determining whether the engine is operated if it is determined in the step of comparing the cumulative sample counter that the value obtained by cumulating the sample counters is not greater than the predetermined threshold value TH4 for resetting the sample counter and the suspicion counter or after the step of resetting the sample counter and the suspicion counter is performed, wherein if the engine is operated, the procedure is returned to the step of determining turbo operation.

By the method of detecting a defeat device having configuration as mentioned above in accordance with the present disclosure, it is possible to detect a defeat device which is intended to falsify input data for controlling the engine in order to raise output of the engine over a predetermined range.

In addition, even if the defeat device is removed after being installed, history of installation of the defeat device remains so that such fact can be recognized at the time of maintenance or inspection and hence cause of failure of the engine can be found out accurately and an appropriate measure thereto can be made.

Further, it is possible to minimize driving on the road in a state that the defeat device is installed by inducing a driver to remove the defeat device or visit a repair shop through a warning lamp and the like.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 2 is a block diagram showing a state that a defeat device for falsifying data input to an engine is installed according to a related art; and FIGS. 3A and 3B are flowcharts showing a method of detecting a defeat device, according to an embodiment of the present disclosure.

DETAILED DESCRIPTION OF SPECIFIC EMBODIMENTS

Figure 1:
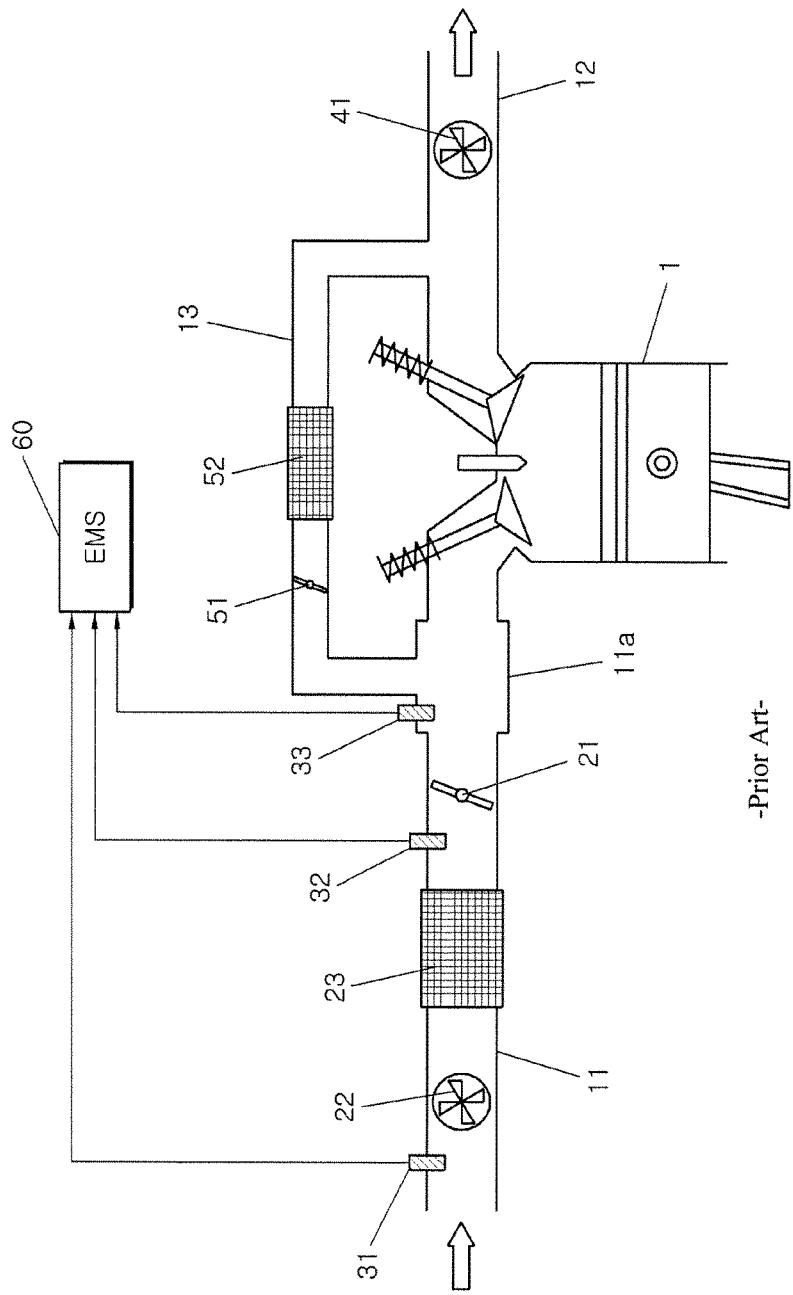
FIG. 1 is a block diagram showing a structure of a conventional engine.

Hereinafter, a method of detecting a defeat device according to an embodiment of the present disclosure is described in detail with reference to the accompanying drawings.

First, referring to FIG. 2, a system for performing a method of detecting a defeat device according to an exemplary embodiment the present disclosure is described below, since the structure of an engine according to the present disclosure has the same structure as the conventional art.

Outside air for combustion is introduced into an engine 1 through an intake pipe 11 and exhaust gas generated after combustion in the engine 1 is exhausted to the outside through an exhaust pipe 12.

The intake pipe 11 has a throttle valve 21 for regulating amount of the air flowing into the engine 1, a compressor 22 of a turbocharger for turbocharging the air flowing into the engine 1 and an intercooler 23 for cooling the air passed through the compressor 22.

The exhaust pipe 12 has a turbine 41 of the turbocharger, which rotates with the aid of pressure of the exhaust gas and drives the compressor 22.

An EGR line 13 for recirculating a part of the exhaust gas is provided with an EGR valve 51 for regulating amount of the exhaust gas and an EGR cooler 51 for cooling the air recirculated.

Further, a hot-film air mass flow sensor (HFM) 31 arranged at an inlet of the intake pipe 11 to measure temperature and the amount of the intake air, a boost pressure sensor 32 installed between the compressor 22 and the throttle valve 21 to measure pressure boosted by turbo operation and a manifold absolute pressure (MAP) sensor 33 for measuring pressure in the intake manifold 11a are installed.

When output values of the HFM sensor 31, the boost pressure sensor 32 and the MAP sensor 33 are output to an engine management system (EMS) 60, the EMS 60 uses the values input therein to control the combustion of the engine 1.

On the other hand, there is a case where a defeat device 70 for falsifying values input to the EMS 60 is installed such that the engine 1 generates output greater than a predetermined output. In this case, the defeat device 70 is generally installed between the boost pressure sensor 32 and the EMS 60 to reduce the boost pressure value to be input to the EMS 60 and input the reduced value to the EMS.

Considering that if the boost pressure value is reduced, flow rate of the air passing through the throttle valve 21 is calculated to be smaller than an actual value, the present disclosure configures the EMS 60 to model pressure in the intake manifold 11a and compare the modeled pressure with the value of the MAP sensor 33 or compare the flow rate passing through the intake manifold 11a with the flow rate passing through the throttle valve 21, thereby detecting whether or not the defeat device 70 is installed.

The EMS 60 is configured to detect whether or not the defeat device 70 is installed by means of a logic to be described later and such fact can be recognized by a driver through a warning lamp 80 or the like.

As shown in FIGS. 3A and 3B, a method of detecting a defeat device according to an embodiment of the present disclosure comprises: determining (turbo operation wherein it is determined) whether a turbocharger of a vehicle is operated in step S110; determining (flow rate of the air to be applied to an intake manifold wherein it is determined) whether which flow rate out of flow rate of the air passing through the throttle valve 21 and flow rate of the air measured by the HFM sensor 31 is used as the flow rate of the intake manifold 11a in step S130; determining whether pressure in the intake manifold 11a, which is obtained by modeling the flow rate of the intake manifold 11a, is in a normal range in step S140; and storing history that a defeat device 70 is installed if it is determined in the step S140 of determining whether pressure in the intake manifold is in the normal range that the pressure in the intake manifold 11a is not in the normal range in step S171.

The step S110 of determining turbo operation determines whether the turbocharger of the engine 1 is operated in a state that the engine 1 drives. Since the principle for detecting whether or not the defeat device is installed in the present disclosure is based on the boost pressure measured by the boost pressure sensor 32, it is determined whether the turbocharger is operated.

In a step S120 of increasing a sample counter, the sample counter is increased when the turbocharger is operated. The following steps are carried out while increasing the sample counter. If the number of cases where installation of the defeat device 70 is suspected during a predetermined cumulative sample counter exceeds a predetermined number, it is confirmed that the defeat device 70 is installed.

In the step S130 of determining flow rate of the air to be applied to an intake manifold, the pressure in the intake manifold 11a is modeled to detect the defeat device 70 and it is determined whether the flow rate of the intake manifold 11a used in modeling the pressure in the intake manifold 11a is adopted as the flow rate passing through the throttle valve.

In the step S130 of determining flow rate of the air to be applied to an intake manifold, the pressure in the intake manifold 11a is used as a measure to determine whether the defeat device 70 is installed, and it is determined whether which flow rate is adopted as input flow rate of the intake manifold 11a that is required for modeling the pressure in the intake manifold 11a. Either the flow rate of the air passing through the throttle valve 21 or the flow rate measured by the HFM sensor 31 is used as the flow rate of the air flowing into the intake manifold 11a.

Adopted as the flow rate to be input to the intake manifold 11a is the flow rate of the throttle valve in the case of a vehicle equipped with only the MAP sensor 33 without the HFM sensor 31, but the flow rate of the air measured by the HFM sensor 31 in the case of a vehicle equipped with the HFM sensor 31.

In the step S140 of determining whether the pressure in the intake manifold is in a normal range, it is determined whether the pressure in the intake manifold 11a is normal. If the pressure in the intake manifold 11a is determined as being normal in the step S140 of determining whether pressure of the intake manifold is in a normal range, the defeat device 70 is not installed. Therefore, a step S190 of determining whether the engine is operated is performed immediately instead of performing each of steps next to the step S140. However, if it is determined that the pressure in the intake manifold 11a is not normal, each of steps next to the step S140 is performed to finally detect whether the defeat device 70 is installed.

Since the logic for controlling the engine 1 can identify whether which flow rate out of the flow rate of the throttle valve and the flow rate measured by the HFM sensor is used as the flow rate of the air flowing into the intake manifold 11a, it is determined by using any one of the two flow rates whether the pressure in the manifold 11a is normal.

On the other hand, the step S140 of determining whether the pressure in the intake manifold is in a normal range may be separated into and performed in a first step S141 of determining whether the pressure in the intake manifold is in a normal range, which will be performed if the flow rate of the intake manifold 11a is determined to be the flow rate of the throttle valve in the step S130 of determining flow rate of the air to be applied to the intake manifold, and a second step S142 of determining whether the pressure in the intake manifold is in a normal range, which will be performed when the flow rate of the intake manifold 11a is determined to be not the flow rate of the throttle valve in the step S130.

The first step S141 of determining whether the pressure in the intake manifold is in a normal range determines whether ratio of the pressure measured by the MAP sensor 33 to the modeled pressure of the intake manifold 11a that is calculated with the flow rate passing through the throttle valve 21 exceeds a predetermined value. If the defeat device 70 is installed, the pressure measured by the boost pressure sensor 32 is reduced and hence the flow rate of the air passing through the throttle valve 21 is detected to be smaller than the actual flow rate so that the modeled pressure of the intake manifold 11*a*, which is estimated by using the flow rate, becomes smaller than the pressure measured by the MAP sensor 33. Therefore, if it is determined that a value obtained by dividing the pressure measured by the MAP sensor 33 by the modeled pressure of the intake manifold 11*a* (pressure measured by the sensor/modeled pressure) exceeds a predetermined first threshold value TH1, it can be considered that the defeat device 70 is installed.

The second step S142 of determining whether the pressure in the intake manifold is in a normal range determines whether ratio of the flow rate of the air measured by the HFM sensor 31 to the flow rate passing through the throttle valve 21 exceeds a predetermined value. If the defeat device 70 is installed, the flow rate of the air passing through the throttle valve 21 is detected to be smaller than the actual flow rate so that there is a difference between said flow rate and the flow rate measured by the HFM sensor 31. Therefore, if it is determined that a value obtained by dividing the flow rate measured by the HFM sensor 31 by the flow rate of the throttle valve 21 (HFM flow rate/throttle flow rate) exceeds a predetermined second threshold value TH2, it can be considered that the defeat device 70 is installed.

A step S150 of increasing a suspicion counter increases the suspicion counter when it is determined in the first step S141 or second step S142 of determining whether the pressure in the intake manifold is in a normal range that the defeat device 70 is installed. When it is determined in the first step S141 or second step S142 of determining whether the pressure in the intake manifold is in a normal range that the defeat device 70 is temporarily installed, it may be confirmed that the defeat device 70 is installed. However, the suspicion counter may be increased when it is estimated that the defeat device 70 is installed and then confirm that the defeat device 70 is installed when the cumulative value of the suspicion counter is larger than a predetermined value, instead of confirming that the defeat device 70 is installed in the first step S141 or second step S142 of determining whether the pressure in the intake manifold is in a normal range. This is to confirm whether the defeat device 70 is installed after the suspicion counters are cumulated because flow rate of the air or output value of sensors may be temporarily unstable.

A step S160 of confirming that the defeat device is installed compares the cumulative suspicion counter cumulated in the step S150 of increasing the suspicion counter with a predetermined third threshold value TH3 on which confirmation of installation of the defeat device 70 is based. In the step S160 of confirming that the defeat device is installed, if the cumulative suspicion counter exceeds the third threshold value TH3, it is confirmed that the defeat device 70 is installed and hence values output from the boost pressure sensor 32 are falsified.

A step S171 of storing history that the defeat device is installed stores the fact that the defeat device 70 is installed when the cumulative suspicion counter is determined to be greater than the third threshold value TH3 in the step S160 of confirming that the defeat device is installed. For example, it is possible to confirm whether the defeat device 70 is installed at the time of future maintenance or inspection by storing history of installation of the defeat device 70 in the EMS 60 for example in the form of failure codes.

A step S172 of warning that the defeat device is installed notifies a driver that the defeat device 70 is installed. Notifying to the driver that the defeat device 70 is installed may be made by turning on a separate warning lamp 80 installed inside the vehicle, or turning on an engine warning lamp or indicating a separate message on an instrument cluster. Alternately, a warning sound is generated to notify the driver that the defeat device 70 is installed.

It is possible to induce the driver to visit a repair shop to repair the vehicle by providing a warning to the driver that the defeat device 70 is installed as mentioned above.

A step S181 of comparing a cumulative sample counter is performed when the cumulative suspicion counter does not exceed the third threshold value TH3 in the step S160 of confirming that the defeat device is installed. A step S181 of comparing a cumulative sample counter compares whether a value obtained by cumulating sample counters is greater than a predetermined fourth threshold value TH4 for resetting the sample counter and the suspicion counter.

A step S182 of resetting the counters resets the sample counter and the suspicion counter to '0' when the cumulative sample counter exceeds the fourth threshold value TH4. If the cumulative suspicion counter does not exceed the third threshold value TH3 while the cumulative sample counter exceeds the fourth threshold value TH4, it is certain that the defeat device 70 is not installed and thus the sample counter and the suspicion counter are reset to '0'.

A step S190 of determining whether the engine is operated determines whether the engine 1 is operated.

If it is determined that the engine 1 is operated in the step S190 of determining the engine is operated, the procedure returns to a step S110 of determining turbo operation whereby the steps as described above are performed again.

If it is determined that the engine 1 is not operated, the procedure is terminated.

On the other hand, the step S190 of determining whether the engine is operated may be performed after the step S172 of warning that the defeat device is installed or the step S182 of resetting the counters is performed. Further, if it is determined in the first step S141 of determining whether the pressure in the intake manifold is in a normal range that the value obtained by dividing the pressure measured by the MAP sensor 33 by the modeled pressure of the intake manifold 11*a* (pressure measured by the sensor/modeled pressure) does not exceed the predetermined first threshold value TH1, or if it is determined in the second step S142 of determining whether the pressure in the intake manifold is in a normal range that the value obtained by dividing the flow rate of the air measured by the HFM sensor 31 by the flow rate of the throttle valve 21 (HFM flow rate/throttle flow rate) does not exceed the predetermined second TH2, the step S190 may also be performed. Moreover, the step S190 may also be performed when it is determined in the step S181 of comparing the cumulative sample counter that the cumulative sample counter does not exceed the fourth threshold value.

Although the present disclosure has been described in the foregoing with reference to the drawings illustrated by way of example, the present disclosure is not limited to the disclosed embodiments, and it will be apparent to those of ordinary skill in the art that various modifications and variations can be made to the present disclosure without departing from the spirit and scope of the invention. Therefore, such modifications or variations fall within the scope of the present disclosure as claimed and the scope of the present disclosure should be interpreted based on the appended claims.

What is claimed is:

1. A method of detecting a defeat device, the method comprising:
   determining, by an engine management system (EMS), turbo operation when a turbocharger of a vehicle is operated;
   determining, by the EMS, flow rate of air to be applied to an intake manifold, which includes determining which flow rate among a first flow rate of air passing through a throttle valve and a second flow rate of air measured by a hot-film air mass flow (HFM) sensor is used as the flow rate of the intake manifold;
   determining, by the EMS, whether pressure in the intake manifold is in a normal range based on the flow rate of the intake manifold; and
   determining, by the EMS, that the defeat device is installed when it is determined that the pressure in the intake manifold is not in the normal range, and storing information of the defeat device.

2. The method according to claim 1, further comprising, after the step of determining whether the pressure in the intake manifold is in the normal range:
   increasing, by the EMS, a suspicion counter representing that the defeat device is estimated to be installed when it is determined that the pressure in the intake manifold is not in the normal range; and
   confirming, by the EMS, that the defeat device is installed by determining whether a value obtained by cumulating the suspicion counters is greater than a threshold value on which confirmation of installation of the defeat device is based,
   wherein when the value obtained by cumulating the suspicion counters is greater than the threshold value on which confirmation of installation of the defeat device is based, the step of storing information that the defeat device is installed is performed.

3. The method according to claim 1, wherein when the first flow rate passing through the throttle valve is applied as the flow rate of the intake manifold in the step of determining the flow rate of the air to be applied to the intake manifold, it is determined whether a value obtained by dividing pressure measured by a manifold absolute pressure (MAP) sensor by the pressure in the intake manifold exceeds a first threshold value.

4. The method according to claim 1, wherein when the second flow rate of the air measured by the HFM sensor is applied as the flow rate of the intake manifold in the step of determining the flow rate of the air to be applied to the intake manifold, it is determined whether a value obtained by dividing the second flow rate measured by the HFM sensor by the first flow rate of the throttle valve exceeds a second threshold value.

5. The method according to claim 1, further comprising:
   warning, by a warning lamp, the installation of the defeat device for notifying a driver that the defeat device is installed after the step of storing information that the defeat device is installed is performed.

6. The method according to claim 2, further comprising:
   increasing a sample counter at every time the turbocharger is operated between the step of determining the turbo operation and the step of determining the flow rate of the air to be applied to the intake manifold,
   wherein when the value obtained by cumulating the suspicion counters exceeds a predetermined value within a number of times that the sample counters are cumulated, it is confirmed that the defeat device is installed.

7. The method according to claim 6, further comprising:
   comparing whether or not the value obtained by cumulating the sample counters is greater than a threshold value for resetting the sample counter and the suspicion counter when it is determined in the step of confirming that the defeat device is installed that the value obtained by cumulating the suspicion counters is not greater than the threshold value on which confirmation of installation of the defeat device is based; and
   resetting the sample counter and the suspicion counter to zero when the value obtained by cumulating the sample counters exceeds the threshold value for resetting the sample counter and the suspicion counter.

8. The method according to claim 1, further comprising:
   determining whether an engine is operated when it is determined in the step of determining turbo operation that the turbocharger is not operated or when it is determined in the step of determining whether pressure in the intake manifold is in the normal range that the pressure in the intake manifold is in the normal range,
   wherein when the engine is operated, the procedure returns to the step of determining the turbo operation.

9. The method according to claim 5, further comprising:
   determining whether the engine is operated after the step of warning that the defeat device is installed is performed,
   wherein when the engine is operated, the procedure returns to the step of determining the turbo operation.

10. The method according to claim 7, further comprising:
    determining whether the engine is operated when it is determined in the step of comparing the cumulative sample counter that the value obtained by cumulating the sample counters is not greater than the threshold value for resetting the sample counter and the suspicion counter or after the step of resetting the sample counter and the suspicion counter is performed,
    wherein when the engine is operated, the procedure returns to the step of determining the turbo operation.

* * * * *